United States Patent
Marconnet

(10) Patent No.: US 10,234,551 B2
(45) Date of Patent: Mar. 19, 2019

(54) METHOD AND SYSTEM FOR MANAGING DATA FROM AN AIRCRAFT RADIO ALTIMETER

(71) Applicant: AIRBUS OPERATIONS (S.A.S.), Toulouse (FR)

(72) Inventor: Nicolas Marconnet, Castelnau d'Estretefonds (FR)

(73) Assignee: AIRBUS OPERATIONS (S.A.S.), Toulouse (FR)

(*) Notice: Subject to any disclaimer, the term of this patent is extended or adjusted under 35 U.S.C. 154(b) by 347 days.

(21) Appl. No.: 15/154,246

(22) Filed: May 13, 2016

(65) Prior Publication Data
US 2016/0341824 A1 Nov. 24, 2016

(30) Foreign Application Priority Data
May 19, 2015 (FR) .................................. 15 54480

(51) Int. Cl.
  *G01S 13/60* (2006.01)
  *G01S 13/70* (2006.01)
  *G01S 13/86* (2006.01)
  *G01S 13/87* (2006.01)
  *G01S 13/88* (2006.01)

(52) U.S. Cl.
CPC ............ *G01S 13/882* (2013.01); *G01S 13/60* (2013.01); *G01S 13/70* (2013.01); *G01S 13/86* (2013.01); *G01S 13/87* (2013.01)

(58) Field of Classification Search
CPC .............................. G01S 13/60; G01S 13/882
See application file for complete search history.

(56) References Cited

U.S. PATENT DOCUMENTS

| | | | | |
|---|---|---|---|---|
| 3,761,946 A | * | 9/1973 | Johannessen | G01S 13/345 342/101 |
| 3,774,204 A | * | 11/1973 | Preston | G01S 13/60 342/107 |
| 3,906,497 A | * | 9/1975 | Brasier | G01S 11/06 342/120 |
| 3,944,968 A | * | 3/1976 | Bateman | G01C 5/005 244/182 |
| 4,146,890 A | * | 3/1979 | Klensch | G01S 13/588 342/105 |
| 4,157,544 A | * | 6/1979 | Nichols | G01S 13/86 342/120 |

(Continued)

OTHER PUBLICATIONS

French Search Report and Written Opinion for Application No. 1554480 dated Mar. 3, 2016.

*Primary Examiner* — Peter M Bythrow
(74) *Attorney, Agent, or Firm* — Jenkins, Wilson, Taylor & Hunt, P.A.

(57) ABSTRACT

A method and system for managing data from an aircraft radio-altimeter. The data management system includes a monitoring unit for checking, automatically and repetitively, when the radio-altimeter is outside of its operational range, from data generated by the radio-altimeter for a predetermined duration, whether the trend of the data corresponds to an aircraft approaching the ground, and a data transmission unit configured to automatically transmit the data generated by the radio-altimeter to a user system, only if the monitoring unit considers that the trend of the data corresponds to an aircraft approaching the ground.

9 Claims, 2 Drawing Sheets

(56) References Cited

U.S. PATENT DOCUMENTS

| | | | | |
|---|---|---|---|---|
| 4,567,483 A * | 1/1986 | Bateman | G01C 5/005 | 340/970 |
| 4,792,799 A * | 12/1988 | Grove | G01C 5/005 | 340/963 |
| 4,801,110 A * | 1/1989 | Skutecki | G05D 1/0676 | 244/17.13 |
| 4,849,756 A * | 7/1989 | Bateman | G01C 5/005 | 340/963 |
| 4,868,916 A * | 9/1989 | Ablov | G01S 13/86 | 340/963 |
| 4,980,684 A * | 12/1990 | Paterson | G01C 5/005 | 244/17.11 |
| 5,109,230 A * | 4/1992 | Hassenpflug | G01S 13/86 | 342/117 |
| 5,235,513 A * | 8/1993 | Velger | G01S 1/70 | 244/183 |
| 5,410,317 A * | 4/1995 | Ostrom | G01S 13/94 | 342/120 |
| 6,484,071 B1 * | 11/2002 | Conner | G01C 5/005 | 244/180 |
| 6,507,289 B1 * | 1/2003 | Johnson | G01S 7/4004 | 340/970 |
| 6,583,733 B2 * | 6/2003 | Ishihara | B64D 45/04 | 340/946 |
| 6,785,594 B1 * | 8/2004 | Bateman | G01C 5/005 | 340/970 |
| 7,576,684 B2 * | 8/2009 | Oven | G01S 7/046 | 342/120 |
| 7,911,375 B2 * | 3/2011 | Winstead | G01C 5/005 | 342/120 |
| 8,204,637 B1 * | 6/2012 | Everson | G06Q 30/0202 | 345/440 |
| 8,432,308 B2 * | 4/2013 | Delga | G01C 5/005 | 342/120 |
| 8,583,296 B2 * | 11/2013 | Allen | B64D 45/00 | 701/4 |
| 8,604,970 B1 * | 12/2013 | Trinkaus | G01S 13/882 | 342/120 |
| 8,687,056 B2 * | 4/2014 | Yahav | G02B 27/01 | 348/115 |
| 8,723,695 B2 * | 5/2014 | Bourret | G01S 7/40 | 340/970 |

* cited by examiner

METHOD AND SYSTEM FOR MANAGING DATA FROM AN AIRCRAFT RADIO ALTIMETER

CROSS-REFERENCE TO RELATED APPLICATION

This application claims the benefit of and priority to French patent application No. 15 54480 filed on May 19, 2015, the entire disclosure of which is incorporated by reference herein.

TECHNICAL FIELD

The present disclosure relates to a method and a system for managing data from a radio-altimeter of an aircraft, in particular of a transport airplane.

BACKGROUND

A radio-altimeter is an avionics system whose function is to determine the height (called "radio-altimetric height") of the aircraft above the ground, that is to say the vertical distance between the ground being flown over and the aircraft. This system is based on the measurement of the time that elapses between the emission of a frequency-modulated carrier and the reception of this carrier after reflection by the ground. The radio-altimeter is used, notably, for precision approaches on a transport airplane.

To satisfy the requirements of the embedded systems which use the radio-altimetric data (namely the "radio-altimetric heights") determined by the radio-altimeter, and notably those of an automatic piloting system, the radio-altimeter has to provide an item of information on height from 0 feet to approximately 5000 feet corresponding to its operational range. Beyond this height, the radio-altimeter no longer receives the signal reflected by the ground and therefore transmits a fixed value to these user systems, accompanied by an information item indicating that the radio-altimetric datum can no longer be determined.

During flight phases which are situated above this operational range (that is to say above 5000 feet), the radio-altimeter can provide a value which corresponds to any object which would be located within the radiation pattern of its antennas, such as, for example, when flying over another aircraft that is cruising where the spacing between the aircraft is generally around 1000 feet.

The possibility of detection of an object flown over by the radio-altimeter at any moment outside of its operational range requires the user systems to implement coherence logics to avoid inappropriate behavior. These logics tend to increase the complexity of the implementation of these user systems.

SUMMARY

An object of the present disclosure is to remedy this drawback. A method and system are disclosed for managing data from an aircraft radio-altimeter, the radio-altimeter having an operational range and being suitable for generating data corresponding to radio-altimetric heights and for determining whether it is within its operational range or not.

According to the disclosure herein, the method in one aspect comprises:
 a monitoring step consisting in or comprising checking, automatically and repetitively, when the radio-altimeter is outside of its operational range, from data generated by the radio-altimeter for a predetermined duration, whether the trend of the data corresponds to an aircraft approaching the ground; and
 a data transmission step consisting in or comprising transmitting, automatically, the data generated by the radio-altimeter, only if the monitoring step considers that the trend of the data corresponds to an aircraft approaching the ground.

In order to avoid reporting the distance to an object (aircraft) flown over when the radio-altimeter is outside of its operational range, the method of the disclosure herein consists in monitoring the trend of the radio-altimetric height generated over a given period of time (or duration), in order to determine whether this trend corresponds to an aircraft which is approaching a terrain (or ground) or not. Only the radio-altimetric heights when the aircraft is approaching the ground are then communicated.

Thus, by virtue of the disclosure herein, the objects which could be flown over and detected by the radio-altimeter when the radio-altimeter is outside of its operational range are disregarded, by taking account of the trend of the radio-altimetric height.

In a preferred embodiment, the monitoring step consists or comprises:
 from the data generated by the radio-altimeter, determining a vertical speed; and
 considering that the aircraft is approaching the ground, only if the duly determined vertical speed is negative for the predetermined duration.

Furthermore, in another embodiment, the monitoring step consists or comprises:
 determining the vertical trend of values of an auxiliary datum;
 comparing this vertical trend to the trend of the data generated by the radio-altimeter for the same duration; and
 considering that the trend of the data corresponds to an aircraft approaching the ground, only if these two trends are similar.

In this case, preferably, the auxiliary datum is one of the following data:
 an inertial datum;
 a barometric altitude datum;
 an altitude datum deriving from a satellite positioning system.

Moreover, advantageously:
 when the radio-altimeter is outside of its operational range, the monitoring step is repeated until the trend of the data corresponds to an aircraft approaching the ground; and
 when the monitoring step considers that the trend of the data corresponds to an aircraft approaching the ground, the implementation of the monitoring step is stopped, and is so stopped until the radio-altimeter is once again outside of its operational range.

The present disclosure relates also to a system for managing data from an aircraft radio-altimeter, as cited above.

According to the disclosure herein, the management system comprises:
 a monitoring unit configured to automatically check, when the radio-altimeter is outside of its operational range, from data generated by the radio-altimeter for a predetermined duration, whether the trend of the data corresponds to an aircraft approaching the ground; and
 a data transmission unit configured to automatically transmit the data generated by the radio-altimeter, only if the monitoring unit considers that the trend of the data corresponds to an aircraft approaching the ground.

In a preferred embodiment, the monitoring unit comprises:
- a data processing element configured to automatically determine, from the data generated by the radio-altimeter, a vertical speed; and
- a computation element configured to automatically deduce that the aircraft is approaching the ground, only if the vertical speed is negative for the predetermined duration.

In another embodiment, the monitoring unit comprises:
- a data processing element configured to automatically determine the vertical trend of the values of an auxiliary datum; and
- a comparison element configured to automatically compare this vertical trend to the trend of the data generated by the radio-altimeter and to consider that the trend of the data corresponds to an aircraft approaching the ground, only if these two trends are similar.

The present disclosure further relates to a radio-altimetric data generation assembly, comprising a radio-altimeter, and a data management system, as described above.

BRIEF DESCRIPTION OF THE DRAWINGS

The attached figures will be the clear understanding of how the disclosure herein can be produced. In these figures, identical references denote similar elements.

DETAILED DESCRIPTION

Figure 1:
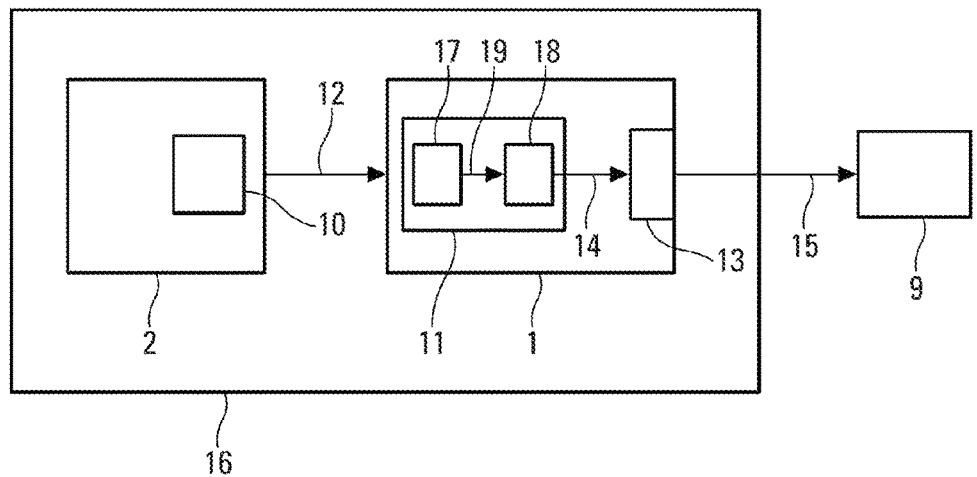
FIG. 1 is the block diagram of a preferred embodiment of a system for managing data from a radio-altimeter.
Figure 3:
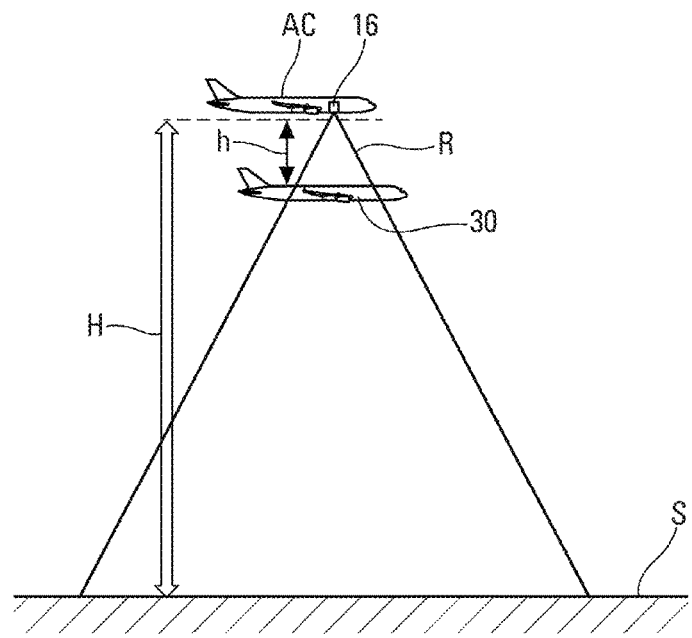
FIG. 3 is a schematic representation illustrating an aircraft equipped with a system according to the disclosure herein flying over another aircraft.

The system 1 schematically represented in FIG. 1 and making it possible to illustrate the disclosure herein, is a system for managing data from a radio-altimeter 2 embedded on an aircraft AC (FIG. 3).

Generally, an aircraft such as a transport airplane comprises two or three autonomous radio-altimeters 2. The radio-altimeter 2 is used notably for precision approaches on a transport airplane.

Figure 2:
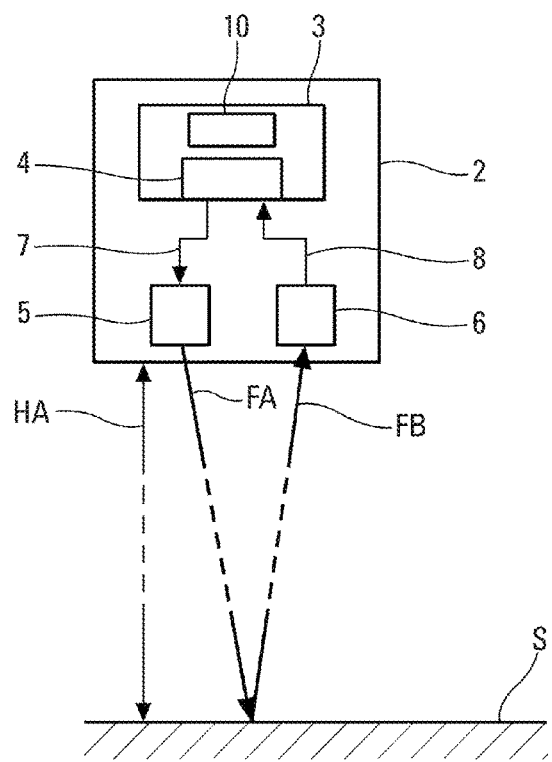
FIG. 2 schematically illustrates a radio-altimeter, making it possible to explain its operation.

Usually, the radio-altimeter 2 comprises, as represented in FIG. 2:
- a processing unit 3 comprising a transceiver 4;
- a transmission antenna 5; and
- a reception antenna 6.

Coaxial cables 7 and 8 link the transceiver 4 to each of these antennas 5 and 6.

The radio-altimeter 2 has an operational range from 0 feet to approximately 5000 feet, for which it supplies radio-altimetric data, namely the height HA (called "radio-altimetric height") of the aircraft (on which it is embedded) above the ground S, that is to say the vertical distance between the ground S being flown over and the aircraft.

The operation of the radio-altimeter 2 is based on the measurement of the time that elapses between the transmission via the transmission antenna 5 of a frequency-modulated carrier FA and the reception via the reception antenna 6 of this carrier FB after reflection by the ground S, as illustrated in FIG. 2.

When the aircraft flies above the abovementioned height (of the order of 5000 feet), the radio-altimeter 2 no longer receives the signal reflected by the ground S and transmits a fixed value to the user systems, accompanied by an information item indicating that the radio-altimetric datum can no longer be determined and that it is therefore outside of its operational range.

The radio-altimeter 1 comprises an element 10 which is, for example, incorporated in the unit 3 and which is configured to determine whether the radio-altimeter 2 is within its operational range, that is to say whether the ground S is in range of the signal generated thereby.

However, beyond this operational range (that is to say at a height H from the ground greater than 5000 feet), the radio-altimeter could supply a value h corresponding to the distance relative to any object which might be located within the radiation pattern R of its antennas, notably when flying over another aircraft 30 that is cruising where the spacing between the aircraft is generally around 1000 feet, as represented by way of illustration in FIG. 3.

An object of the data management system 1 is, notably, to detect whether a datum supplied by the radio-altimeter 2 corresponds to the height H relative to the ground S being flown over or to the height h relative to a flying object (aircraft 30) that is flown over.

For this, the data management system 1 comprises, according to the disclosure herein, as represented in FIG. 1:
- a monitoring unit 11 (automatic) configured to carry out a check when the radio-altimeter 2 reports that it is outside of its operational range (information item supplied by the element 10), that is to say above 5000 feet relative to the ground. The monitoring unit 11 is configured to check, automatically and repetitively, from the radio-altimetric heights generated by the radio-altimeter 2 and received via a link 12 for a predetermined duration, whether the trend of the received data (radio-altimetric heights) corresponds to an aircraft approaching the ground; and
- a data transmission unit 13 (automatic) which is linked to the monitoring unit 11 via a link 14 and which is configured to transmit, to a user system 9 via a link 15, the data generated by radio-altimeter 2, and do so only if the monitoring unit 11 concludes that the trend of the received data corresponds to an aircraft approaching the ground (and thus not to the detection of another flying object) (or aircraft) that is flown over).

Thus:
- when the radio-altimeter 2 is outside of its operational range, the monitoring step implemented by the monitoring unit 11 is repeated until the trend of the data corresponds to an aircraft AC approaching the ground S; and
- when the monitoring unit 11 considers that the trend of the data corresponds to an aircraft AC approaching the ground S, the implementation of the monitoring step is stopped, and is so until the radio-altimeter 2 is once again outside of its operational range (checking done by the element 10).

Consequently, the data management system 1 is configured to disregard the signal reflected from an aircraft that is flown over in a flight phase where the radio-altimeter is not situated within its operational range.

The radio-altimeter 2 and the data management system 1 (hereinafter "system 1") form part of a radio-altimetric data generation assembly 16.

Furthermore, the user system 9 can correspond to any system embedded on the aircraft which uses a radio-altimetric height, and in particular to an automatic piloting system.

In a preferred embodiment represented in FIG. 1, the monitoring unit 11 of the system 1 comprises:
- a data processing element 17 configured to automatically determine, from the data generated by the radio-altimeter 2 and received via the link 12, a vertical speed; and
- a computation element 18 linked via a link 19 to the element 17 and configured to automatically deduce that the aircraft is approaching the ground, only if the vertical speed is negative for the predetermined duration.

In this preferred embodiment:
- the trend of the radio-altimetric height is monitored when the radio-altimeter is outside of its operational range;
- if the radio-altimetric height decreases continually and reaches the value of a counter corresponding to a duration, then the object flown over corresponds to a terrain (ground); otherwise, the object flown over does not correspond to a terrain and represents an aircraft that is flown over, as illustrated in FIG. 3;
- if the system 1 determines that the radio-altimetric height is relative to a terrain, this radio-altimetric height is reported; otherwise, the radio-altimetric height is disregarded by the assembly 16.

In another embodiment represented in FIG. 4, the monitoring unit 11 comprises:
- an element 20 for receiving values of an auxiliary datum specified hereinbelow;
- a data processing element 21 which is linked via a link 22 to the element 20 and which is configured to automatically determine the vertical trend of the received values of this auxiliary datum; and
- a comparison element 23 which is linked via a link 24 to the element 21 and which is configured to automatically compare this vertical trend to the (vertical) trend of the data generated by the radio-altimeter and to consider that the trend of the data corresponds to an aircraft approaching the ground, only if these two trends are similar, that is to say if they vary in the same direction.

The auxiliary datum concerned can be one of the following data:
- an inertial datum;
- a barometric altitude datum; and
- an altitude datum deriving from a satellite positioning system, in particular of GPS or similar type.

For this, the assembly 16 can comprise an assembly 25 comprising at least one means for determining the values of the auxiliary datum and transmitting them via a link 26 to the element 20.

Figure 4:
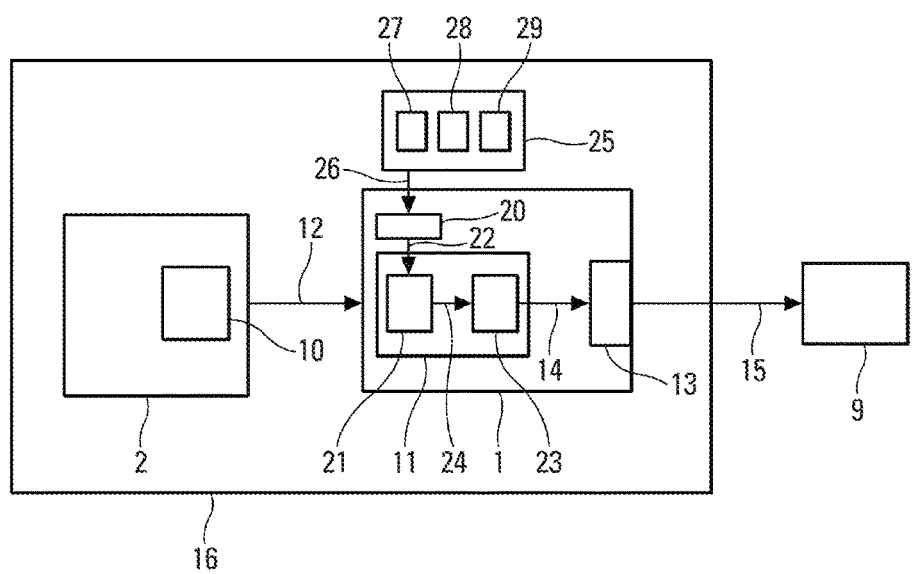
FIG. 4 is the block diagram of a particular embodiment of a system for managing data from a radio-altimeter.

In a first variant of the embodiment of FIG. 4, the assembly 25 comprises an inertial unit 27 or any other embedded system making it possible to determine inertial data of the aircraft. In this variant, the comparison unit 23 determines whether the aircraft is approaching a terrain or flying over an aircraft by comparing the trend of the radio-altimetric height received from the radio-altimeter to the trend of the inertial datum, vertically. If the inertial vertical datum trends concurrently (similarly) to the radio-altimetric datum and the vertical speeds are negative, then the aircraft is approaching a terrain, otherwise it is flying over an aircraft.

Furthermore, in a second variant of this embodiment, the assembly 25 comprises a standard unit 28 suitable for determining the barometric altitude of the aircraft. In this variant, the comparison unit 23 compares the trend of the radio-altimetric height received from the radio-altimeter to the trend of the barometric altitude determined by the unit 28.

Moreover, in a third variant of this embodiment, the assembly 25 comprises a unit 29 forming part of a satellite positioning system, such as the GPS (Global Positioning System) system for example, and suitable for generating an altitude. In this variant, the comparison unit 23 compares the trend of the radio-altimetric height received from the radio-altimeter to the trend of the altitude generated by the unit 29.

The operation of the system 1, as described above, is as follows. When the radio-altimeter 2 is outside of its operational range:
- the system 1 checks, via the monitoring unit 11, automatically and repetitively, from the data generated by the radio-altimeter 2 for a predetermined duration, whether the trend of these data corresponds to an aircraft AC approaching the ground S; and
- the system 1 transmits, via the data transmission unit 13, automatically, the data generated by the radio-altimeter 2, only if the monitoring unit 11 considers that the trend of the data corresponds to an aircraft approaching the ground, otherwise the data are not transmitted.

Thus, in order to avoid reporting the distance to an object (aircraft) flown over when the radio-altimeter is outside of its operational range, the system 1 monitors the trend of the radio-altimetric height generated over a given period of time (or duration), in order to determine whether this trend corresponds to an aircraft which is approaching a terrain (or ground) or not. It communicates only the radio-altimetric heights when the aircraft is approaching the ground.

Consequently, the system 1 disregards the objects which could be flown over and detected by the radio-altimeter when the radio-altimeter is outside of its operational range, by taking account of the trend of the radio-altimetric height.

The system 1, as described above, making it possible for the radio-altimeter 2 to disregard the objects during a flight outside of its operational range, thus notably offers the following advantages:
- a simplification of the algorithms of the radio-altimeter 2 (like the comparison between primary and secondary chains);
- a simplification of the logic of the user system or systems 9;
- an absence of the effect of spurious reflections on elements or parts of the aircraft;
- an elimination of potential alarms which could be generated in the cockpit; and
- improvement in the availability and the integrity of the height (radio-altimetric height) information item (or datum).

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A method for managing data from an aircraft radio-altimeter, the aircraft radio: altimeter having an operational range and being suitable for generating data corresponding to radio-altimetric heights and for determining whether it is within its operational range or not, the method comprising:
   a monitoring step comprising checking, automatically and repetitively, when the aircraft radio-altimeter is outside of its operational range, from data generated by the aircraft radio-altimeter for a predetermined duration, whether a trend of the data corresponds to an aircraft approaching ground or the trend of the data corresponds to the aircraft flying over a different object; and
   a data transmission step comprising:
      disregarding the data generated by the aircraft radio-altimeter if the monitoring step considers that the trend of the data corresponds to the aircraft flying over the different object; and
      transmitting, automatically, the data generated by the aircraft radio-altimeter, only if the monitoring step considers that the trend of the data corresponds to the aircraft approaching the ground.

2. The method as claimed in claim 1, wherein the monitoring step further comprises:
   from the data generated by the aircraft radio-altimeter, determining a vertical speed; and
   considering that the aircraft is approaching the ground, only if the determined vertical speed is negative for the predetermined duration.

3. The method as claimed in claim 1, wherein the monitoring step further comprises:
   determining a vertical trend of values of an auxiliary datum;
   comparing the vertical trend to the trend of the data generated by the aircraft radio-altimeter for the same duration; and
   considering that the trend of the data corresponds to an aircraft approaching the ground, only if the vertical trend and the trend of the data generated by the aircraft radio-altimeter are similar.

4. The method as claimed in claim 3, wherein the auxiliary datum is one of the following data:
   an inertial datum;
   a barometric altitude datum; and
   an altitude datum derived from a satellite positioning system.

5. The method as claimed in claim 1, wherein:
   when the aircraft radio-altimeter is outside of its operational range, the monitoring step is repeated until the trend of the data corresponds to an aircraft approaching the ground; and
   when the monitoring step considers that the trend of the data corresponds to an aircraft approaching the ground, implementation of the monitoring step is stopped, until the aircraft radio-altimeter is once again outside of its operational range.

6. A system for managing data from an aircraft radio-altimeter, the aircraft radio-altimeter having an operational range and being suitable for generating data corresponding to radio-altimetric heights and for determining whether it is within its operational range or not, the system comprising:
   a monitoring unit configured to automatically check, when the aircraft radio-altimeter is outside of its operational range, from data generated by the aircraft radio-altimeter for a predetermined duration, whether a trend of the data corresponds to an aircraft approaching ground or the trend of the data corresponds to the aircraft flying over a different object; and
   a data transmission unit configured to automatically transmit the data generated by the aircraft radio-altimeter, only if the monitoring unit considers that the trend of the data corresponds to an aircraft approaching the ground,
   wherein the data transmission unit is further configured to disregard the data generated by the aircraft radio-altimeter if the monitoring unit considers that the trend of the data corresponds to the aircraft flying over the different object.

7. The system as claimed in claim 6, wherein the monitoring unit comprises:
   a data processing element configured to automatically determine, from the data generated by the aircraft radio-altimeter, a vertical speed; and
   a computation element configured to automatically deduce that the aircraft is approaching the ground, only if the vertical speed is negative for the predetermined duration.

8. The system as claimed in claim 6, wherein the monitoring unit comprises:
   a data processing element configured to automatically determine a vertical trend of values of an auxiliary datum; and
   a comparison element configured to automatically compare the vertical trend to the trend of the data generated by the aircraft radio-altimeter and to consider that the trend of the data corresponds to an aircraft approaching the ground, only if the vertical trend of the value of the auxiliary datum and the trend of the data generated by the aircraft radio-altimeter are similar.

9. A radio-altimetric data generation assembly comprising an aircraft radio-altimeter, and a data management system as claimed in claim 6.

* * * * *